June 20, 1967  A. J. WITHOFF  3,325,833
SPRING CUSHIONS, SUCH AS MATTRESSES
Filed Dec. 21, 1962  2 Sheets-Sheet 1

Inventor
Alfred J. Withoff
by W. Bartlett Jones,
Attorney

June 20, 1967 A. J. WITHOFF 3,325,833
SPRING CUSHIONS, SUCH AS MATTRESSES
Filed Dec. 21, 1962
2 Sheets-Sheet 2
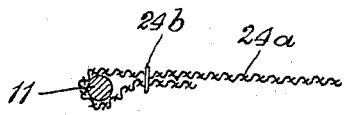
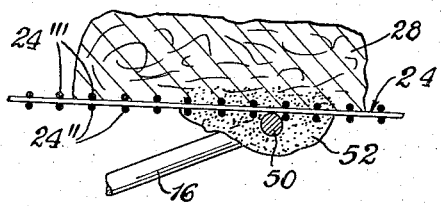
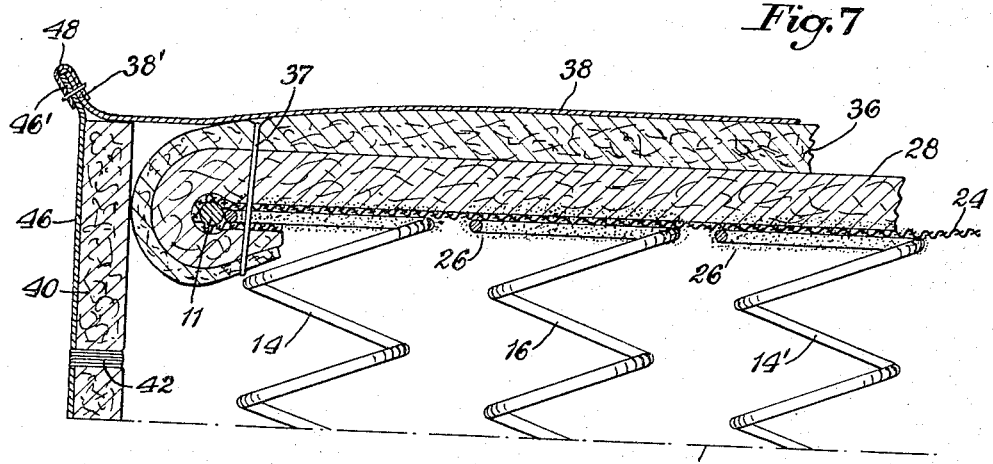
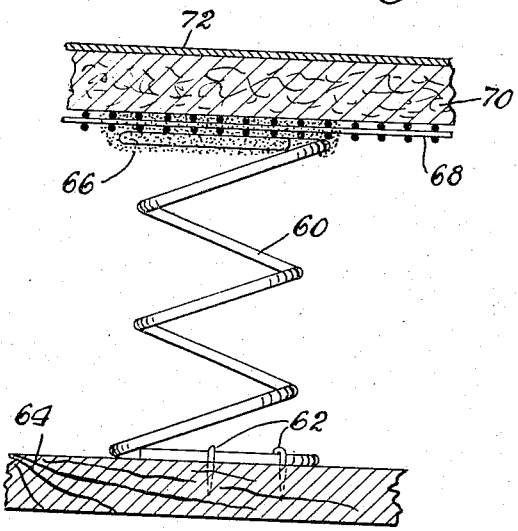
Inventor
Alfred J. Withoff
by W. Bartlett Jones,
Attorney

United States Patent Office 3,325,833
Patented June 20, 1967

3,325,833
SPRING CUSHIONS, SUCH AS MATTRESSES
Alfred J. Withoff, Cloquet, Minn., assignor to Wood Conversion Company, St. Paul, Minn., a corporation of Delaware
Filed Dec. 21, 1962, Ser. No. 246,580
16 Claims. (Cl. 5—351)

The present invention is a continuation-in-part of my prior application Ser. No. 816,925, filed May 29, 1959, now Patent No. 3,070,814 issued Jan. 1, 1963.

The present invention relates to spring cushion structures such as mattresses, which have spring wire coils to provide resiliency.

Heretofore, such spring cushion structures have been formed by locating a gang of coil springs in close association, and connecting each spring to adjacent springs by wire ties. Such a structure requires considerable expenditure of time and effort to produce, and the manufacturing procedure is not suitable for use in a continuous production line.

The present invention aims to improve the manufacture of such structures by dispensing with the necessity of tying one spring to adjacent springs with individual ties.

It is the general object of the invention to provide a spring cushion structure in which at least the face exposed for use has the end coils of springs tied to other springs only by flexible tension-resistant facing material to which the ends of springs are adhesively secured.

It is also an object of the invention to produce a mattress in which each of a multiplicity, if not all, of the coil springs are connected at both faces of the mattress to other springs only by flexible tension-resistant facing material provided as spring insulator means.

It is a particular object of the invention to provide a coil-spring cushion, such as a mattress, in which some or all of the outermost or border springs are tied mechanically to a border wire, and in which the interior springs are connected at at least one face of the cushion to each other and to the border springs only by spring insulator means.

A further object of the invention is to arrange the springs in parallel rows and in staggered relation in adjacent parallel rows, with the springs of each row located so that each lies opposite the space between adjacent springs in an adjacent row.

It is also an object of the invention to locate staggered springs so that in staggered relation a spring of one row lies in part in the space between adjacent springs of an adjacent row.

Other objects and advantages of the invention will become apparent from the following description and explanation of the invention, in which:

FIG. 5 shows a modified form similar to FIG. 4, wherein the spring-insulator sheet is applied and secured before the cushioning material is applied.

FIG. 6 shows the structure of FIG. 4 as it is included in a finished mattress.

FIG. 7 shows in cross-section the preferred location of adhesive around a spring wire, through a mesh fabric and within cushioning material.

FIG. 8 shows in cross-section a fragment of a spring cushion in which the bases of the springs are secured to a solid base or foundation.

In my copending application Ser. No. 816,925, filed May 29, 1959, of which the present application is a continuation-in-part, there is disclosed structure which prevents dimpling of a spring-insulator sheet, conventionally used to cover the exposed ends of coil springs, into the open spaces of a spring foundation. Such open spaces exist within the top coil of each coil spring, and between springs and tie wires from spring to spring.

Dimpling is prevented by use of an adhesive, which is anchored to the end coil of the springs and to the insulator sheet. The adhesive is preferably applied by coating the wires in the face of the spring unit, including the coil wires and the tie wires, with a thick viscous adhesive, such as a latex, which sets on standing. This is easily done by dipping the spring unit into a bath of latex, then applying the spring insulator sheet per se, or as a sheet carried by a layer of cushioning material. The insulator sheet may be a cotton net or scrim having about six meshes per inch. Thus, each open area in the spring foundation is provided with a so-called drumhead adhesively secured to the wires bounding the open area.

According to the present invention, the non-dimpling advantages of my said prior invention are retained, but new advantages are secured.

By virtue of the locations of the springs and of the adhesive union between the spring-insulator and the wires in the face of a coil-spring foundation, I have found that ties from coil to coil may be omitted, and their function provided by the spring-insulator. As a result of eliminating the tie wires, I have found it advantageous to locate springs in closer relation than heretofore, and accordingly, they may be arranged in parallel rows in staggered relation.

In order to secure additional advantage from the staggered arrangement, it is preferred to have the springs in one row in part fitting into the space between adjacent springs in an adjacent row. It has been found that by these arrangements, the springs may be closely spaced and staggered in rows which are parallel in four directions, in at least three of which the staggered rows are interfitting.

Figure 1:
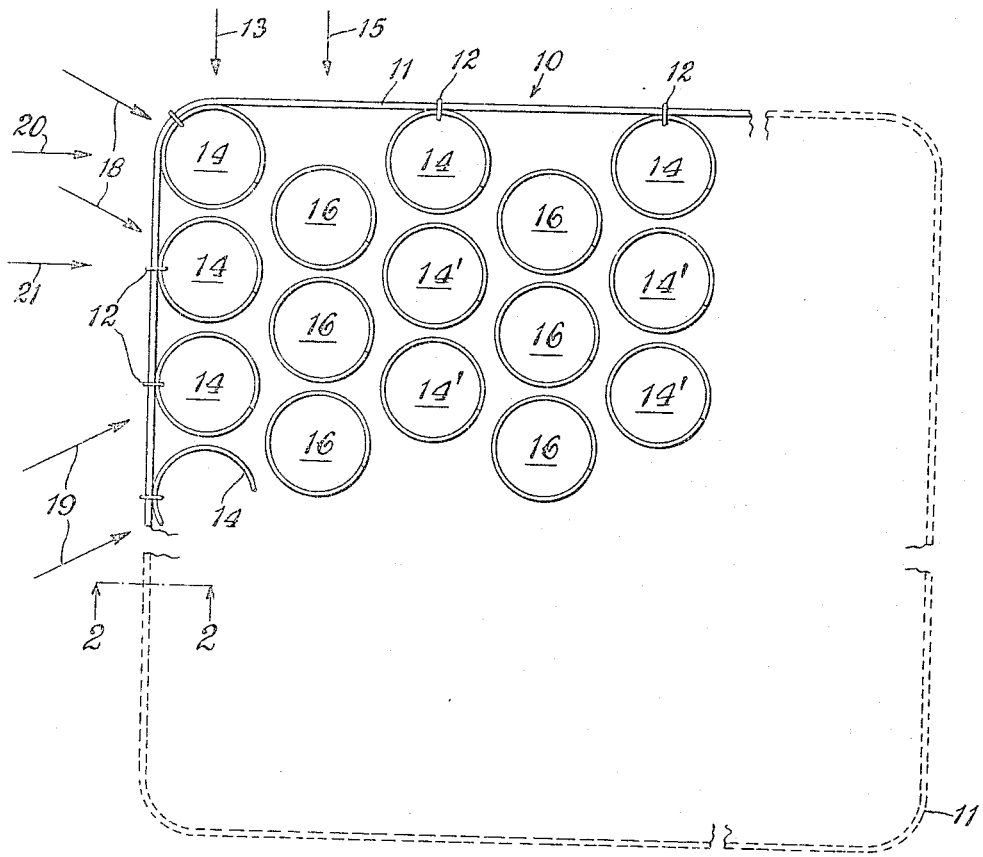
FIG. 1 represents in full lines one of the identical corners in the face of a coil-spring foundation, outlined by the broken dotted line.

FIG. 1 shows a pattern of coil-spring locations, and represents the face of a coil-spring foundation which is to receive a spring-insulator. FIG. 1 illustrates a rectangular spring unit 10 for a mattress of which unit only one corner is shown in full lines, the other corners being the same. Numeral 11 represents a border wire at the face of the unit, to which the border springs are united by clamping rings 12.

The long side has a row 13 (represented by an arrow) of springs 14, spaced but closely positioned, there being 21 springs approximately 3⅛ inches in diameter in row 13 at the face shown. Adjacent row 13 there is a row indicated by arrow 15 of similar springs 16 staggered in relation to springs 14, there being 20 springs in the row 15. Rows 13 and 15 repeat in the same relation in the direction of the width. Rows 13 and 15 as shown are so close together that the lines tangent to the end coils of the two rows are very slightly spaced. By altering either or both of the dimensions for the width of the mattress and for the diameter of the coils, the staggered springs 14 and 16 in rows 13 and 15 could be positioned to interfit.

The mattress shown has 8 rows 13 and 7 rows 15, thus providing 308 springs.

None of the interior springs 14' of the inner rows 13 are tied, in the face shown, to the border wire 11 or to another spring. None of the springs 16 of rows 15 are tied, in the face shown, to the border wire 11 or to another spring.

Coils 14' and 16, not tied to each other in the face shown in FIG. 1, are to be interconnected in the completed mattress only by a spring-insulator to which they are to be adhesively secured. So secured coils 14' and 16 are also all connected by the spring-insulator to border springs 14 by adhesively securing the spring-insulator to the border springs 14. In addition, the spring-insulator is secured to the border wire 11, mechanically, with or without additional securement by adhesive. To set apart border springs 14 from the springs 14' and 16, the latter two are termed herein interior springs. As such, they constitute "the multiplicity" of springs recited in the claims, to which the present invention is directed, i.e., coil springs of which the ends in one face are connected in said face to other springs only by the spring-insulator adhesively secured to them. It is contemplated that all the coil springs of a cushion or like structure may constitute said multiplicity. In the form shown in FIG. 1 wherein all of the coil springs are adhesively secured to the spring-insulator, the coils 14 are excluded from the said multiplicity because they are interconnected by their securement to the border wire. By omitting the border wire in FIG. 1, the springs 14 qualify for inclusion in said multiplicity.

In FIG. 1, the arrangement of springs shown provides not only parallel rows 13 and 15 in one direction, but also parallel rows 18 in another direction and parallel rows 19 in a third direction. The springs in parallel rows 18 are mutually staggered and in part are interfitting, and the same relations characterize the springs of parallel rows 19.

In FIG. 1, the end springs 14 of row 13 and its repeating parallel rows are alined in a row 20 designated by an arrow, which row 20 repeats lengthwise of the form. Parallel to first row 20 is a row 21 of coils 16, which row repeats, alternating with repeating rows 20. Thus, there are two sets of parallel rows in a fourth direction. The springs 14 or 14' and 16 of parallel alternating rows 20 and 21, respectively, are staggered and are interfitting to a greater extent than shown for the interfitting of the adjacent parallel rows 18 and the adjacent parallel rows 19.

The mattress illustrated and described herein is reversible, and in consequence, FIG. 1 represents the appearance of both faces of the spring foundation.

In order better to illustrate the structure of the mattress in detail, fragmentary views are shown illustrating the growth of the structure.

Figure 3:
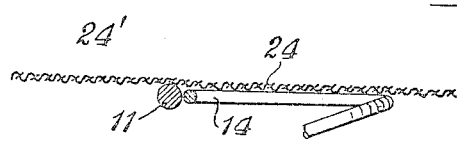
FIG. 3 is a view similar to FIG. 2 showing the positional relationship during assembly of a spring-insulator sheet at the border.
Figure 2:
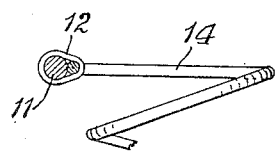
FIG. 2 is an enlarged fragmentary cross-section taken on line 2—2 of FIG. 1, illustrating securement of a spring to a border wire.

FIG. 2 shows a fragmentary cross-section on line 2—2 of FIG. 1, to illustrate one of said clamping rings 12 which tie end coils of springs 14 to the border wire 11. FIG. 3 shows the positional relationship (adhesive being omitted) of a spring 14 and a spring-insulator sheet 24 in the form of a conventional strong cotton net of about 6 meshes per inch. The sheet 24 in assembly extends at 24' beyond the border wire 11. FIG. 3 shows the spring insulator 24 as an isolated sheet, over which cushioning material may be placed. However, because of the method of securing the springs to the open-mesh sheet 24, it is advantageous to supply the spring-insulator sheet 24 as a secured liner on cushioning material. Thereby, the adhesive used may not only bind to the insulator sheet, but pass through its meshes and be anchored to the cushioning material and surround coils of the cotton net, and penetrate the cushioning material if its face is suitably open to receive adhesive. Such a laminated structure illustrates one form of "facing material" which term is used to designate the sole means in a face connected to each spring of said multiplicity.

Figure 4:
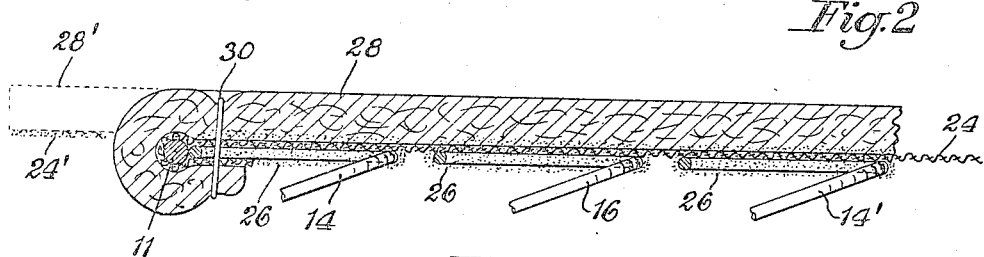
FIG. 4 is a view similar to that of FIG. 3 showing a border spring and an interior spring adhesively united to facing material comprising a spring-insulator sheet and cushioning material.

FIG. 4 shows a portion of a structure in which the border springs 14 are secured as shown in FIG. 2, and in which interior springs 14' and 16 have their end coils secured by adhesive 26 to the facing material comprising said cotton net 24 adhesively carried as a liner on a cushioning layer such as a fiber mat 28, which may be ¾-inch thick at a density of about two pounds per cu. ft. The facing material 24–28 is adhesively secured to border springs 14 and initially extends beyond border wire 11 as shown at 28' in dotted lines. The extending portion is wrapped around the border wire 11, and secured to its upper layer as by staples 30.

It is not necessary that the spring-insulator sheet be carried by cushioning material. When not so carried, it may be placed in position as shown in FIG. 5, wherein a sheet form of spring-insulator, such as burlap 24$^a$ when placed against the springs, is wrapped around border wire 11 and secured to itself by staple 24$^b$.

FIG. 6 shows the mattress structure at an edge thereof. Line 32 indicates a center line across which the mattress structure is a mirror image of the part shown. In FIG. 6, the adhesive 26 is illustrated by stippling in order better to illustrate the parts. After the insulator sheet and the springs 14 and 14' and 16 are mutually secured by adhesive to the spring-insulator 24 and through its meshes to the cushioning layer 28, there is placed over the cushioning layer a topping 36 of soft felt or the like, such as a garnetted layer of cotton fiber, which may also be wrapped around the border wire 11 and fixed by staples 37. The topping may be thicker centrally of the mattress and thin out toward the edges to give the desired rounded effect. Over the topping a ticking 38 is applied in a conventional manner with an edge extension 38'.

A border panel is placed along the side, which may consist of a cushioning layer 40 sewed at 42 to ticking 46, which has an extending portion 46'. The ticking extensions 38' and 46' are encompassed by sewing them within a tape or edging 48.

When cushioning material 28 carries an open-mesh spring-insulator sheet, such as shown at 24, adhesively secured to it, the additional advantage is illustrated in FIG. 7. FIG. 7 shows in cross-section the end coil 50 of an interior spring 16, secured by latex adhesive 52 to cotton net insulator 24, shown by its crossing cords 24" and 24‴, which is adhesively secured to a cushioning layer 28 by an adhesive (not shown). The latex adhesive 52 is shown looped around wire 50 of spring 16, surrounding cords 24' and 24" of the cotton net, and entering and anchored to the cushioning layer 28, which is suitably open to receive adhesive. The wire 50 of coil 16 in FIG. 7 is representative of all the wires of the adhesively secured springs 14 and the multiplicity of springs 14' and 16 in the face of a spring unit, such as shown in FIG. 1, illustrating the anchorage of the wires to a spring-insulator sheet 24 by adhesive 26 anchored to the sides of the wires and preferably wrapped around the wires, and extending laterally from the wires and anchored to the spring-insulator. This extent of the adhesive may be effected as described hereinafter.

The invention is not limited to mattresses, and is applicable otherwise, as for example, to seat cushions and chair-backs. When such cushions or backs are not reversible, the described facial relation of the springs and the tension-resistant spring-insulator may be limited to one face, permitting some other form of facing material or other structure at the opposite face. Such other structure may be one having the ends of the coils tied together, as in the prior art manner, or they may be secured to a facing material which is a rigid base, such as a wooden platform or slats. They may be so secured to such facing material by mechanical means, or by the latex adhesive in the manner described.

FIG. 8 shows a fragment of such a structure in which coil springs, such as spring 60, are stapled at 62 to a wooden base 64. The upper end of the spring 60 is unsecured, except by adhesive 66 anchored to spring-insulator sheet 68 in the manner described. Over the sheet 68 is a separate layer of cushioning material 70 and a cover of upholstery cloth 72.

Heretofore, mattress springs have been arranged in spaced parallel rows in one direction in each of which rows adjacent springs have their end coils in contact and tied together. In the direction right angular thereto, the springs of adjacent rows are alined and tied by wires across the space between them.

By the arrangement above-described in reference to FIG. 1, more springs may be used, as results of the staggering and of the interfitting.

When it is desired to have the adhesive looped around the wires, the preferred method of applying the adhesive is to dip the end of a coil in a bath of viscous latex which sets on standing, then to place the adhesive carrying coil on the spring-insulator. The viscous adhesive drains to some extent from the wire, thus extending laterally from the wire and penetrating such available interstics as exist in the spring-insulator and the cushioning material, while a residue remains looped around the wire.

In a structure such as shown in FIG. 8, the assembly of base 64 and springs 60 is inverted and dipped into the adhesive bath. In producing a structure such as the mattress in which both faces are constructed according to the present invention, springs may be individually dipped and placed on the insulator sheet, or held in a jig so that all may be dipped at once. Howsoever the first face is produced with the adhesive set, it may be inverted to permit dipping the free ends, thus illustrating one way to position all the springs of the multiplicity for a single dipping.

From the foregoing, it is to be understood that the invention is not limited to the illustrative structures above described, but includes modifications thereof and other structures falling within the scope of the invention as set forth in the accompanying claims.

I claim:

1. A spring cushion structure comprising a multiplicity of individual upright coiled wire springs having their first and second ends positioned in resiliently spaced surfaces, facing material defining each of said surfaces, at least a first one of said facing materials being flexible and having flexible tension-resistant layer positioned adjacent the first ends of each of said springs, means securing the first and second ends of each of said springs to said facing materials, said means consisting of adhesive material anchored to the sides of the wires extending inwardly from said first and second ends of each of said springs, said adhesive material extending laterally from said wires to said facing materials and being anchored thereto, each of said springs of said multiplicity thereof being directly connected at each of their ends to others of said springs of said multiplicity only by said facing materials adhesively anchored thereto, the portions of said layer between the first ends of said springs being exposed in the direction toward the opposite ends of said springs.

2. A spring cushion according to claim 1 in which the springs of said multiplicity are arranged in parallel rows in at least one direction and in which the springs in adjacent parallel rows in said direction are in staggered relation.

3. A spring cushion according to claim 1 in which the springs of said multiplicity are arranged in parallel rows in at least one direction and in which the springs in adjacent parallel rows in said direction are in staggered relation and in interfitting relation with the springs of one row being in part positioned in the space between adjacent springs in the adjacent row.

4. A mattress comprising two spaced flexible facing materials and resilient coiled wire springs therebetween, said mattress having a peripheral border of such springs connected at their ends to border wires, and within said border a multiplicity of said coiled wire springs having their ends secured to said facing materials by the hereinafter mentioned adhesive, each of said facing materials including an inner flexible tension-resistant layer positioned against the ends of said multiplicity of interior springs, said adhesive being anchored to sides of the wires extending inwardly from the two ends of each of said interior springs and extending laterally from said wires to said tension-resistant layers and anchored thereto, each of said interior springs being connected directly to other springs only by said tension-resistant layers, the portions of said layers between the ends of said springs secured thereto being exposed in the direction toward the opposite ends of said springs.

5. A mattress according to claim 4 in which all the springs thereof are arranged in parallel rows in at least one direction and in which the springs in adjacent rows in said direction are in staggered relation.

6. A mattress according to claim 4 in which all the springs thereof are arranged in parallel rows in at least one direction and in which the springs in adjacent rows in said direction are in staggered relation and in interfitting relation with the springs of one row being in part positioned in the space between adjacent springs in the adjacent row.

7. A mattress according to claim 4 in which all the springs thereof are arranged in parallel rows in from one to four directions and in which the springs in adjacent rows in from one to three of said directions are in staggered relation and in interfitting relation with the springs of one row being in part positioned in the space between adjacent springs in the adjacent row.

8. In a spring cushion structure having at least one pressure-receiving face and having a multiplicity of upright coil springs of wire, and having a spring insulator over the end coils in said face, the improvement in which at least the coils inwardly from the periphery of said face are free from attachment except at their end coils and except by said spring insulator, and in which said spring insulator is a flexible tension-resistant layer connected by adhesive to the end coils in said face, the portions of said spring insulator between the ends of the springs secured thereto being exposed in the direction toward the opposite ends of said springs.

9. A spring structure according to claim 8 in which the adhesive extends along the sides of the wires of the end coils.

10. A spring structure according to claim 8 in which the adhesive extends around the wires of the end coils.

11. A spring structure according to claim 8 in which there are two identical parallel faces.

12. In a spring cushion structure having at least one pressure-receiving face and having a multiplicity of upright coil springs of wire arranged in parallel rows in at least one direction, and having a spring insulator over the end coils in said face, the improvement in which at least the coils inwardly from the periphery of said face are free from attachment except at their end coils and except by said spring insulator, in which said spring insulator is a flexible tension-resistant layer connected by adhesive to the end coils in said face and in which the coils in adjacent rows are in staggered relation, the portions of said spring insulator between the ends of the springs secured thereto being exposed in the direction toward the opposite ends of said springs.

13. In a spring cushion structure having at least one pressure-receiving face and having a multiplicity of upright coil springs of wire arranged in parallel rows in two right angular directions, and having a spring insulator over the end coils in said face, the improvement in which at least the coils inwardly from the periphery of said face are free from attachment except at their end coils and except by said spring insulator, in which said spring insulator is a flexible tension-resistant layer connected by adhesive to the end coils in said face and in which the coils in adjacent rows of each direction are in staggered relation, the portions of said spring insulator between the ends of the springs secured thereto being exposed in the direction toward the opposite ends of said springs.

14. A spring structure according to claim 13 in which there are adjacent parallel rows with springs in staggered and interfitting relation.

15. In a spring cushion structure having spaced parallel pressure-receiving faces and having a multiplicity of upright coil springs of wire arranged in parallel rows between said faces, and having a spring insulator over the end coils in each of said faces, the improvement in which at least the coils inwardly from the periphery of each said face are free from attachment except at their end coils and except by said spring insulator, in which said spring insulator is a flexible tension-resistant layer connected by adhesive to the end coils in each said face and in which the coils in adjacent rows are in staggered relation, the portions of said spring insulators between the ends of the springs secured thereto being exposed in the direction toward the opposite ends of said springs.

16. A spring structure according to claim 15 in which there are adjacent parallel rows with springs in staggered and interfitting relation.

References Cited
UNITED STATES PATENTS

| | | | |
|---|---|---|---|
| 2,385,870 | 10/1945 | Lashar et al. | 5—353 X |
| 2,610,333 | 9/1952 | Piliero | 5—351 |
| 2,775,287 | 12/1956 | Mantegna | 5/351 |
| 2,874,389 | 2/1959 | Koenigsberg | 5—361 X |
| 2,954,076 | 9/1960 | Crane et al. | 267—83 X |
| 3,049,730 | 8/1962 | Wall et al. | 5—351 |
| 3,070,814 | 1/1963 | Withoff | 267—80 X |

DAVID J. WILLIAMOWSKY, *Primary Examiner.*

FRANK B. SHERRY, *Examiner.*

A. M. CALVERT, *Assistant Examiner.*